(12) United States Patent
Yang et al.

(10) Patent No.: US 11,922,924 B2
(45) Date of Patent: Mar. 5, 2024

(54) MULTILINGUAL NEURAL TEXT-TO-SPEECH SYNTHESIS

(71) Applicant: Microsoft Technology Licensing, LLC, Redmond, WA (US)

(72) Inventors: Jingzhou Yang, Redmond, WA (US); Lei He, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 61 days.

(21) Appl. No.: 17/617,547

(22) PCT Filed: May 21, 2020

(86) PCT No.: PCT/US2020/033890
§ 371 (c)(1),
(2) Date: Dec. 8, 2021

(87) PCT Pub. No.: WO2021/002967
PCT Pub. Date: Jan. 7, 2021

(65) Prior Publication Data
US 2022/0246136 A1    Aug. 4, 2022

(30) Foreign Application Priority Data
Jul. 2, 2019   (CN) .......................... 201910588478.3

(51) Int. Cl.
*G10L 25/78* (2013.01)
*G10L 13/00* (2006.01)
(Continued)

(52) U.S. Cl.
CPC ............ *G10L 13/10* (2013.01); *G10L 13/033* (2013.01); *G10L 13/047* (2013.01)

(58) Field of Classification Search
CPC .......... G10L 25/78; G10L 13/00; G10L 13/27
See application file for complete search history.

(56) References Cited

U.S. PATENT DOCUMENTS 11,410,684 B1 *   8/2022   Klimkov ................. G10L 25/78
2018/0075343 A1   3/2018   Van Den Oord et al.

FOREIGN PATENT DOCUMENTS

CN    108711420 A    10/2018
CN    109767755 A    5/2019
(Continued)

OTHER PUBLICATIONS

Fan, et al., "Speaker and language factorization in DNN-based TTS synthesis", In Proceedings of IEEE International Conference on Acoustics, Speech and Signal Processing, Mar. 20, 2016, pp. 5540-5544.

(Continued)

*Primary Examiner* — Shreyans A Patel
(74) *Attorney, Agent, or Firm* — Schwegman Lundberg & Woessner, P.A.

(57) ABSTRACT

Method and apparatus for generating speech through multilingual neural text-to-speech (TTS) synthesis are provided in the present disclosure. A text input in at least a first language may be received. Speaker latent space information of a target speaker may be provided through a speaker encoder. Language latent space information of a second language may be provided through a language encoder. At least one acoustic feature may be generated, through an acoustic feature predictor, based on the text input, the speaker latent space information and the language latent space information of the second language. A speech waveform corresponding to the text input may be generated, through a neural vocoder, based on the at least one acoustic feature.

18 Claims, 8 Drawing Sheets

(51) Int. Cl.
*G10L 13/033* (2013.01)
*G10L 13/047* (2013.01)
*G10L 13/10* (2013.01)

(56) References Cited

FOREIGN PATENT DOCUMENTS

KR        20190085883 A * 7/2019 ............. G10L 13/00
WO     WO-2011004502 A1 * 1/2011 ........... G10L 13/027

OTHER PUBLICATIONS

Li, et al., "Bytes Are All You Need: End-to-end Multilingual Speech Recognition and Synthesis with Bytes", In Proceedings of IEEE International Conference on Acoustics, Speech and Signal Processing, May 12, 2019, pp. 5621-5625.

Li, et al., "Multi-Language Multi-Speaker Acoustic Modeling for LSTM-RNN Based Statistical Parametric Speech Synthesis", In Proceedings of Interspeech, Sep. 8, 2016, pp. 2468-2472.

Liu, et al., "Cross-lingual Multi-speaker Text-to-speech Synthesis for Voice Cloning without Using Parallel Corpus for Unseen Speakers", In Repository of arXiv:1911.11601v1, Nov. 26, 2019, 5 Pages.

Nachmani, et al., "Unsupervised Polyglot Text-to-speech", In Proceedings of IEEE International Conference on Acoustics, Speech and Signal Processing, May 12, 2019, pp. 7055-7059.

"International Search Report and Written Opinion Issued in PCT Application No. PCT/US20/033890", dated Aug. 21, 2020, 15 Pages.

Zhang, et al., "Learning to Speak Fluently in a Foreign Language: Multilingual Speech Synthesis and Cross-Language Voice Cloning", In Repository of arXiv:1907.04448v1, Jul. 9, 2019, 5 Pages.

"Notice of Allowance Issued in European Patent Application No. 20730951.9", dated May 3, 2023, 8 Pages.

"Notice of Allowance Issued in European Patent Application No. 20730951.9", dated Aug. 18, 2023, 2 Pages.

"First Office Action and Search Report Issued in Chinese Patent Application No. 201910588478.3", dated Aug. 16, 2023, 15 Pages.

* cited by examiner

MULTILINGUAL NEURAL TEXT-TO-SPEECH SYNTHESIS

CROSS-REFERENCE TO RELATED APPLICATION

This application is a U.S. National Stage Filing under 35 U.S.C. 371 of International Patent Application Serial No. PCT/US2020/033890, filed May 21, 2020, and published as WO 2021/002967 A1 on Jan. 7, 2021, which claims priority to Chinese Application No. 201910588478.3, filed Jul. 2, 2019, which applications and publication are incorporated herein by reference in their entirety.

BACKGROUND

Text-to-speech (TTS) synthesis is intended to generate a corresponding speech waveform based on a text input. TTS synthesis is widely used for speech-to-speech translation, speech customization for specific users, role play in stories, etc. Neural TTS systems are increasingly being used for implementing TTS synthesis and are becoming a research hotspot in the field of artificial intelligence (AI) in recent years. The neural TTS systems may predict acoustic features based on text inputs and further generate speech waveforms based on the predicted acoustic features. Unlike those conventional TTS techniques that require well-designed front-end language features, the neural TTS systems are modeled with end-to-end architecture and may be trained directly based on, e.g., text-speech data pairs. The neural TTS systems may jointly optimize the pronunciation, prosody, etc. of a speech, which will result in a more natural synthesized speech than the conventional TTS techniques.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose method and apparatus for generating speech through neural text-to-speech (TTS) synthesis. A text input in at least a first language may be received. Speaker latent space information of a target speaker may be provided through a speaker encoder. Language latent space information of a second language may be provided through a language encoder. At least one acoustic feature may be generated, through an acoustic feature predictor, based on the text input, the speaker latent space information and the language latent space information of the second language. A speech waveform corresponding to the text input may be generated, through a neural vocoder, based on the at least one acoustic feature.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
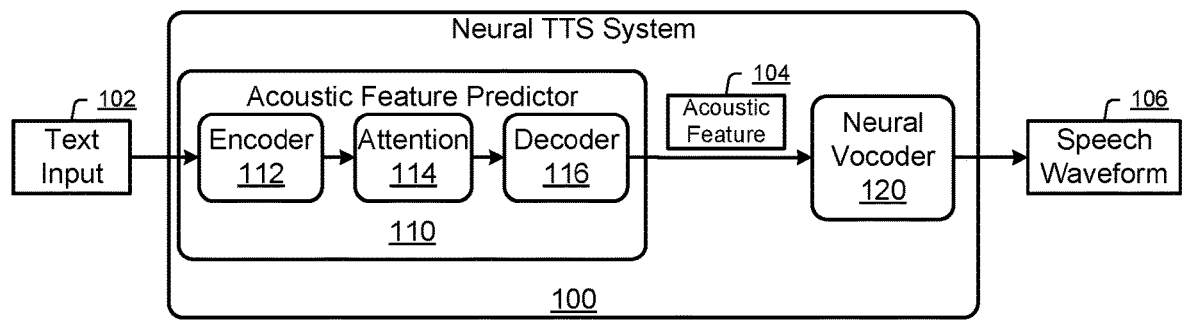
FIG. 1 illustrates an exemplary conventional neural TTS system.

The present disclosure will now be discussed with reference to several example implementations. It is to be understood that these implementations are discussed only for enabling those skilled in the art to better understand and thus implement the embodiments of the present disclosure, rather than suggesting any limitations on the scope of the present disclosure.

Conventional TTS systems use different models for generating speech in different languages. Because these models are independent from each other, it is difficult to utilize knowledge from other languages when generating speech in one language. Therefore, it is impossible to establish high-quality speech for a language with limited training data, and it is difficult to transfer speech from one language to other languages. Moreover, due to the limited amount of multilingual data, it is difficult for the conventional TTS systems to establish multilingual speech, and it is particularly difficult to establish customized speech in different languages with limited monolingual data.

Conventional multilingual TTS systems are usually established by using cross-lingual voice conversion and phoneme mapping. However, due to the limitation of the amount of multilingual data and the quality of voice conversion and phoneme mapping, it is difficult to establish a high-quality multilingual TTS system. An existing system employs a factorized multilingual neural acoustic model, but the system is based on conventional speech synthesis framework, and the model capacity restricts the quality of synthesized speech. Another existing end-to-end multilingual TTS system simply takes Unicode as input, however, the system can only be applied to alphabetic languages such as English, but cannot be effectively applied to non-alphabetic languages such as Chinese.

Embodiments of the present disclosure proposes a multilingual neural TTS system. The multilingual neural TTS system may generate high-quality speech for different speakers in different languages. The system is based on end-to-end architecture and is trained with a large-scale multilingual corpus that includes corpus data from different languages and different speakers. Herein, the corpus may comprise a set of speeches and corresponding text attached to each speech, and thus the corpus may provide multiple text-speech data pairs. Since the multilingual corpus has better content coverage than a single-speaker corpus or a monolingual corpus, when synthesizing speech in languages with limited training data (e.g., languages with a low amount of resources), the system may utilize knowledge from other languages to achieve better generalization performance and generate high-quality speech. Moreover, since the multilingual corpus data in the multilingual corpus is used for training a single multilingual neural TTS system, the system may easily transfer knowledge of one language to other languages. The transfer of knowledge from other speakers and other languages may enable a monoglot speaker to be a polyglot speaker. For example, even if a speaker's voice only appeared in one language during training, the system may generate speech in other languages with the speaker's voice. Since speakers in the multilingual corpus may cover different ages, genders, languages, etc., it is easy to register a new voice with limited data, e.g., generating high-quality speech for a new speaker with limited registration data and in any language covered in the training.

In one aspect, the multilingual neural TTS system according to the embodiments of the present disclosure may implement cross-lingual accent control. For a text input in one language, a speech output with an accent of another reference language may be generated. For example, if the text input is a sentence in English, and it is expected that the generated speech sounds like an English sentence spoken by Chinese, i.e., with a Chinese style, the multilingual neural TTS system may generate an English speech output with a Chinese accent. The multilingual neural TTS system may use language latent space information of the reference language as global conditions to control the accent of the generated speech. Herein, the language latent space information may refer to a representation of prosody of a language in a multi-dimension space, which may reflect various characteristics of the language in a prosody level, e.g., tone, rhythm, speech speed, etc.

In one aspect, the multilingual neural TTS system according to the embodiments of the present disclosure may generate speech in different languages with a speaker's voice. For example, a speaker who speaks only one language is enabled to speak multiple languages. For example, if a speaker only speaks Chinese but not English, even if a text input is a sentence in English, the multilingual neural TTS system may generate an English speech output corresponding to the English sentence with the speaker's voice, and make the speech output sound like spoken by the speaker. The multilingual neural TTS system may use speaker latent space information of a speaker as global conditions, so that the generated speech is in the speaker's voice. Herein, the speaker latent space information may refer to a representation of voice characteristics of a speaker in a multi-dimension space.

In one aspect, the embodiments of the present disclosure propose to train components in the multilingual neural TTS system in an adversarial training approach. Through the adversarial training, when synthesizing multilingual speech for a speaker, speech quality and speaker similarity may be improved. Moreover, through the adversarial training, cross-lingual accent control may be further enhanced.

In one aspect, the multilingual neural TTS system according to the embodiments of the present disclosure may be efficiently tuned to a new speaker, even if the new speaker only has, e.g., limited monolingual corpus data. In one case, the multilingual neural TTS system may be directly applied for generating multilingual speech for the new speaker. In another case, the corpus of the new speaker may be first utilized for updating at least a part of the components of the multilingual neural TTS system, and then the updated system is applied for generating multilingual speech for the new speaker.

In one aspect, the multilingual neural TTS system according to the embodiments of the present disclosure may also be efficiently tuned to a new language. Even if the new language has only a low amount of resources, e.g., limited corpus data, the system may generate high-quality speech in the new language with knowledge from other languages.

The multilingual neural TTS system according to the embodiments of the present disclosure may be applied in various scenarios. In some cases, the multilingual neural TTS system according to the embodiments of the present disclosure may generate speech in different languages with a specific speaker's voice. The specific user may be a public figure, a popular virtual character or movie character, or an ordinary user, etc. For example, when a movie is to be dubbed in different languages, the multilingual neural TTS system may first obtain each actor's voice in the original dubbing of the movie in the original language, and then generate speech in a target language with each actor's voice respectively, thus achieving the dubbing of the movie in the target language. For example, if a virtual chatbot is designed for a specific language, the multilingual neural TTS system may perform language extension to the chatbot so that it is able to provide speech in other languages. In some cases, the multilingual neural TTS system according to the embodiments of the present disclosure may be used for achieving data augmentation. For example, a large amount of speech-text training data is usually required in a speech recognition task, since the multilingual neural TTS system may generate corresponding speech in different languages for a text in different languages and may employ different speakers' voices, it may facilitate effectively to extend the training dataset.

FIG. 1 illustrates an exemplary conventional neural TTS system 100. The neural TTS system 100 may be configured for receiving a text input 102, and generating a speech waveform 106 corresponding to the text input 102. The text input 102 may be a word, phrase, sentence, etc. It should be understood that although the text input 102 is shown as provided to the neural TTS system 100 in FIG. 1, the text input 102 may be first divided into a sequence of elements, e.g., a phoneme sequence, a grapheme sequence, a character sequence, etc., which is then provided to the neural TTS system 100 as input. Herein, "text input" may broadly refer to a sequence of elements obtained from a text input, e.g., a phoneme sequence, a grapheme sequence, a character sequence, etc.

The neural TTS system 100 may comprise an acoustic feature predictor 110. The acoustic feature predictor 110 may predict or generate an acoustic feature 104 based on the text input 102. The acoustic feature 104 may comprise various conventional TTS acoustic features, e.g., mel-spectrum, linear spectrum pair (LSP), etc. The acoustic feature predictor 110 may be based on various model architectures, e.g., sequence-to-sequence model architecture, etc. FIG. 1 illustrates an exemplary sequence-to-sequence acoustic feature predictor 110, which may comprise an encoder 112, an attention unit 114, and a decoder 116.

The encoder 112 may convert information contained in the text input 102 into a space that is more robust and more suitable for learning alignments with acoustic features, e.g., converting the information in the text input 102 to a text feature in the space. The encoder 112 may be based on various network structures, e.g., a network structure comprising a combination of multiple convolutional neural network (CNN) layers and multiple recurrent neural network (RNN) layers, a network structure comprising a combination of a 1-D convolution filter, highway network and a bidirectional RNN, etc.

The attention unit 114 may implement an attention mechanism which is a bridge connecting the encoder 112 and the decoder 116. For example, the attention mechanism may facilitate to align between the text feature output by the encoder 112 and the acoustic feature. The attention unit 114 may implement various types of attention mechanisms, e.g., soft attention, hard attention, location sensitive attention, Gaussian Mixture Model (GMM) attention, etc.

The decoder 116 may map the text feature output by the encoder 112 to the acoustic feature 104 under the influence of the attention mechanism in the attention unit 114. The decoder 116 may be based on various network structures, e.g., a network structure comprising a combination of a feedforward layer, a long short-term memory (LSTM) layer, and a CNN layer, etc.

The neural TTS system 100 may comprise a neural vocoder 120. The neural vocoder 120 may generate a speech waveform 106 based on the predicted acoustic feature 104 output by the acoustic feature predictor 110. The neural vocoder 120 may be based on various network structures, e.g., a network structure which is based on a generative neural model, etc.

Figure 2:
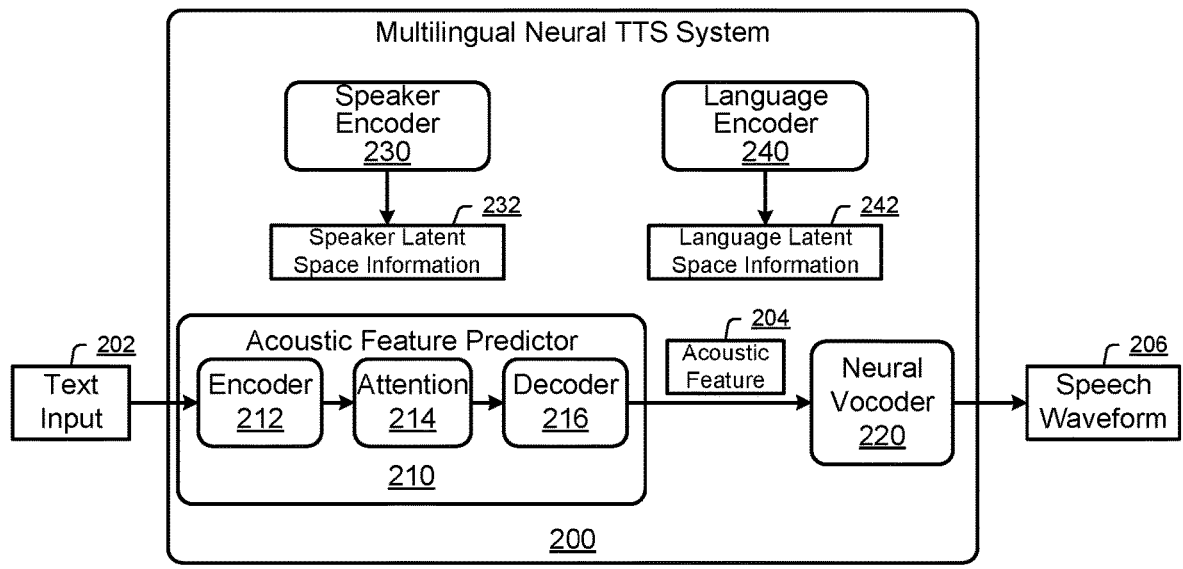
FIG. 2 illustrates exemplary architecture of a multilingual neural TTS system according to an embodiment.

FIG. 2 illustrates exemplary architecture of a multilingual neural TTS system 200 according to an embodiment. It should be understood that the architecture shown in FIG. 2 is only a schematic diagram for the purpose of explaining some concepts or aspects of the present disclosure, and the multilingual neural TTS system 200 may actually have various implementations. The multilingual neural TTS system 200 may generate speech in different languages for multiple speakers involved in a multilingual corpus for training the multilingual neural TTS system 200, and may also generate speech in different languages for a new speaker. During generating speech, the multilingual neural TTS system 200 may consider speaker distinguishing information in a speaker latent space, e.g., speaker latent space information, and language distinguishing information in a language latent space, e.g., language latent space information. During generating speech for a target speaker, speaker latent space information of the target speaker may be used for controlling to generate speech with the target speaker's voice, and language latent space information of a reference language may be used for controlling to generate speech with an accent of the reference language.

As shown in FIG. 2, the multilingual neural TTS system 200 may be configured for receiving a text input 202 in at least one language, and generating a speech waveform 206, which corresponds to the text input 102 and has an accent of a reference language, in a target speaker's voice. The multilingual neural TTS system 200 may comprise an acoustic feature predictor 210, a neural vocoder 220, a speaker encoder 230, and a language encoder 240. The speaker encoder 230 and the language encoder 240 may act together as a global condition encoder in the multilingual neural TTS system 200.

The speaker encoder 230 may provide speaker latent space information 232 of a target speaker. The speaker latent space information 232 may be a representation of speaker characteristics of the target speaker in the speaker latent space, e.g., a speaker embedding vector of the target speaker. The speaker latent space information 232 may be used as additional information provided to the acoustic feature predictor 210 and/or the neural vocoder 220, e.g., a global condition. Thus, the speaker latent space information 232 may be taken into account during the processing by the acoustic feature predictor 210 and/or the neural vocoder 220. It should be understood that although some parts of the present disclosure recites that the speaker embedding vector is provided by the speaker encoder, the speaker embedding vector is merely an exemplary instance of the speaker latent space information provided by the speaker encoder, and operations or processes discussed below in conjunction with the speaker embedding vector may also be applied to any other instances of the speaker latent space information in a similar approach.

The language encoder 240 may provide language latent space information 242 of a reference language. The language latent space information 242 may be a representation of prosody characteristics of the reference language in the language latent space, e.g., a language embedding vector of the reference language. The language latent space information 242 may be used as additional information provided to the acoustic feature predictor 210 and/or the neural vocoder 220, e.g., a global condition. Thus, the language latent space information 242 may be taken into account during the processing by the acoustic feature predictor 210 and/or the neural vocoder 220. It should be understood that although some parts of the present disclosure recites that the language embedding vector is provided by the language encoder, the language embedding vector is merely an exemplary instance of the language latent space information provided by the language encoder, and operations or processes discussed below in conjunction with the language embedding vector may also be applied to any other instances of the language latent space information in a similar approach.

The basic function and structure of the acoustic feature predictor 210 may be similar with those of the acoustic feature predictor 110 in FIG. 1, except that the acoustic feature predictor 210 further considers the speaker latent space information 232 and the language latent space information 242. In other words, the acoustic feature predictor 210 may predict or generate at least one acoustic feature 204 based on the text input 202, the speaker latent space information 232, and the language latent space information 242. The acoustic feature predictor 210 may comprise an encoder 212, an attention unit 214, and a decoder 216. The speaker latent space information 232 and the language latent space information 242 may be combined with the output of the encoder 212 and passed to the attention unit 214. An attention mechanism in the attention unit 214 may utilize the combination of the speaker latent space information 232, the language latent space information 242, and the output of the encoder 212 to affect the processing at the decoder 216. Accordingly, the acoustic feature output by the decoder 216 may be associated with the target speaker and the reference language.

The basic function and structure of the neural vocoder 220 may be similar with those of the neural vocoder 120 in FIG. 1. In an implementation, since the acoustic feature 204 already contains information about the target speaker and the reference language, the neural vocoder 220 may be trained as a general neural vocoder. Thus, the general neural vocoder may directly generate a speech waveform 206 based on the acoustic feature 204. In an implementation, the neural vocoder 220 may further consider the speaker latent space information 232 and/or the language latent space information 242. Although the predicted acoustic feature 204 may already reflect the target speaker's characteristics and the reference language's characteristics, it is still helpful if the processing at the neural vocoder 220 may further consider the speaker characteristics and the reference language characteristics, because the neural vocoder 220 is trained with a multilingual corpus and is actually a neural vocoder adapted to speakers and languages. Therefore, the neural vocoder 220 may also generate the speech waveform 206 based on the acoustic feature 204, and the speaker latent space information 232 and/or the language latent space information 242. It should be understood that the neural vocoder 220 may generate the speech waveform 206 on a sample-by-sample basis, wherein a collection of the samples forms the speech waveform 206.

Through using the speaker latent space information 232 as a global condition of the acoustic feature predictor 210 and/or the neural vocoder 220, the multilingual neural TTS system 200 may control the voice of the generated speech, e.g., making the generated speech sound very similar to the voice of the target speaker. Through using the language latent space information 242 of the reference language as a global condition of the acoustic feature predictor 210 and/or the neural vocoder 220, the multilingual neural TTS system 200 may control the accent of the generated speech, e.g., although the generated speech employs the language of the text input 202, the generated speech may still sound like having the accent of the reference language.

Figure 3:
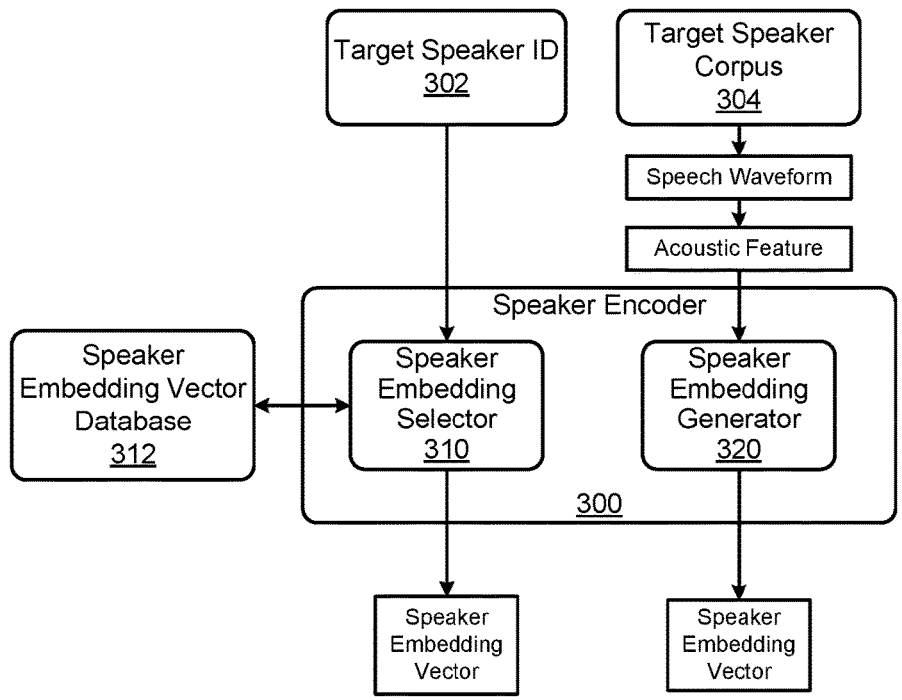
FIG. 3 illustrates an exemplary implementation of a speaker encoder according to an embodiment.

FIG. 3 illustrates an exemplary implementation of a speaker encoder 300 according to an embodiment. The speaker encoder 300 may correspond to the speaker encoder 230 in FIG. 2. The speaker encoder 300 may be implemented in various approaches.

In an implementation, the speaker encoder 300 may be implemented by a speaker embedding selector 310. The speaker embedding selector 310 may obtain identification information 302 of a target speaker, which may be any type of information that is capable of identifying the target speaker from other speakers, e.g., a random number or a designated number corresponding to the target speaker, the name of the target speaker, description information of the target speaker, etc. The identification information is simplified as "target speaker ID" hereinafter. The speaker embedding selector 310 may attempt to retrieve a speaker embedding vector corresponding to the target speaker ID 302 from a speaker embedding vector database 312. The speaker embedding vector database 312 may also be referred to as a speaker latent space information database, and may comprise representations of different speakers' characteristics in any other forms than embedding vectors. The speaker embedding vector database 312 may comprise multiple speaker embedding vectors corresponding to multiple speakers respectively. The speaker embedding vector database 312 may be established through collecting speaker embedding vectors of those speakers in a multilingual corpus during training a multilingual neural TTS system, or may be established through collecting speaker embedding vectors of previous target speakers during applying a multilingual neural TTS system. During establishing the speaker embedding vector database 312, through, e.g., a neural network, etc., the same speaker embedding vector may be generated for multiple different voices from the same target speaker, and different speaker embedding vectors may be generated for different target speakers. A lookup table may be established through labeling speaker embedding vectors corresponding to different target speakers by target speaker IDs of respective target speakers. Thus, when the speaker embedding selector 310 obtains a target speaker ID, it may retrieve a speaker embedding vector of the target speaker through the lookup table.

In an implementation, the speaker encoder 300 may be implemented by a speaker embedding generator 320. The speaker embedding generator 320 may generate a speaker embedding vector corresponding to a target speaker based on a corpus 304 of the target speaker. For example, the corpus 304 of the target speaker may be obtained, which comprises multiple speech waveforms of the target speaker. Acoustic features may be extracted from the speech waveforms in the corpus 304 through various conventional techniques and provided to the speaker embedding generator 320. The speaker embedding generator 320 may generate a speaker embedding vector corresponding to the target speaker based on the acoustic features of the target speaker. The speaker embedding generator 320 may be implemented by various techniques. For example, the speaker embedding generator 320 may be a neural network for generating embedding vectors based on acoustic features. The neural network may map an input acoustic feature sequence with a variable length to a fixed-length embedding vector. The neural network may adopt any sequence model, e.g., a recurrent neural network (RNN) or a transformer. The neural network only extracts speaker information from the input, so that inputs corresponding to the same speaker will result in the same or similar embedding vectors, while inputs corresponding to different speakers will result in different embedding vectors. In one case, the neural network may be pre-trained by a speaker classification task. In another case, if no pre-training is performed, additional constraints may be applied in the training criteria for the neural network, which may minimize the distance among embedding vectors of the same speaker, maximize the distance among embedding vectors of different speakers, etc. Specifically, in addition to the loss adopted in the training of the conventional neural TTS systems, additional losses may be introduced to ensure that the embedding vectors generated for the same speaker are in proximity to each other, and the embedding vectors generated for different speakers are far from each other. For example, an additional loss function may be defined to minimize the distance among the embedding vectors of the same speaker, maximize the distance among the embedding vectors of different speakers, etc.

Figure 4:
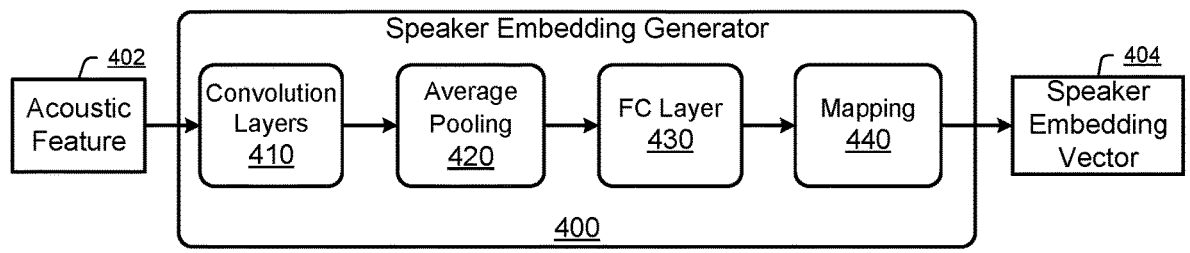
FIG. 4 illustrates an exemplary implementation of a speaker embedding generator according to an embodiment.

FIG. 4 illustrates an exemplary implementation of a speaker embedding generator 400 according to an embodiment. The speaker embedding generator 400 may correspond to the speaker embedding generator 320 in FIG. 3. As shown in FIG. 4, the speaker embedding generator 400 may be based on a neural network for generating a speaker embedding vector 404 based on an acoustic feature 402. The speaker embedding generator 400 may comprise multiple convolution layers 410, average pooling 420, multiple Fully Connected (FC) layers 430, and affine mapping 440 in turn. The speaker embedding vector 404 may be formed through performing L2 normalization to the mapping's output. The speaker embedding generator 400 may be trained with a corpus set of multiple speakers, and is designed for speaker recognition that is independent of text or content. Therefore, the speaker embedding generator 400 may provide, independently from content, better estimation of the speaker embedding vector.

Figure 5:
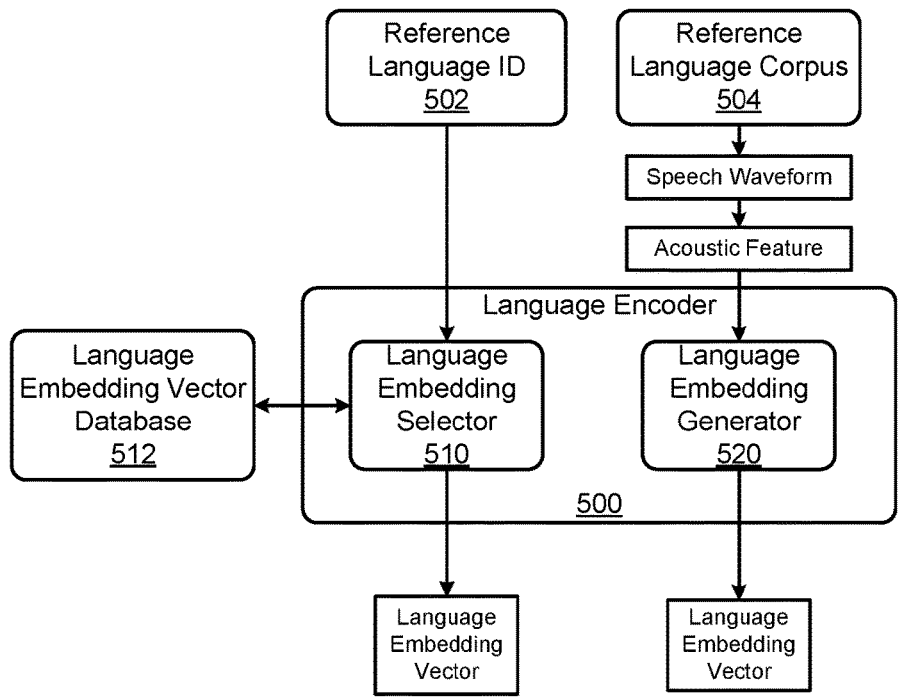
FIG. 5 illustrates an exemplary implementation of a language encoder according to an embodiment.

FIG. 5 illustrates an exemplary implementation of a language encoder 500 according to an embodiment. The language encoder 500 may correspond to the language encoder 240 in FIG. 2. The language encoder 500 may be implemented in various approaches.

In an implementation, the language encoder 500 may be implemented by a language embedding selector 510. The language embedding selector 510 may obtain identification information 502 of a reference language, which may be any type of information that is capable of identifying the reference language from other languages, e.g., a random number or a designated number corresponding to the reference language, the name of the reference language, description information of the reference language, etc. The identification information is simplified as "reference language ID" hereinafter. The language embedding selector 510 may attempt to retrieve a language embedding vector corresponding to the reference language ID 502 from a language embedding vector database 512. The language embedding vector database 512 may also be referred to as a language latent space information database, and may comprise representations of different languages' characteristics in any other form than embedding vectors. The language embedding vector database 512 may comprise multiple language embedding vectors corresponding to multiple languages respectively. The language embedding vector database 512 may be established through collecting language embedding vectors of those languages in a multilingual corpus during the training of the multilingual neural TTS system. During establishing the language embedding vector database 512, through, e.g., a neural network etc., the same language embedding vector may be generated for multiple different voices from the same language, and different language embedding vectors may be generated for different languages. A lookup table may be established through labeling language embedding vectors corresponding to different reference languages by reference language IDs of respective reference languages. Thus, when the language embedding selector 510 obtains a reference language ID, it may retrieve a language embedding vector of the reference language through the lookup table.

In an implementation, the language encoder 500 may be implemented by a language embedding generator 520. The language embedding generator 520 may generate a language embedding vector corresponding to a reference language based on a corpus 504 of the reference language. For example, the corpus 504 of the reference language may be obtained, which comprises multiple speech waveforms in the reference language. Acoustic features may be extracted from speech waveforms in the corpus 504 through various conventional techniques, and provided to the language embedding generator 520. The language embedding generator 520 may generate a language embedding vector corresponding to the reference language based on the received acoustic features. The language embedding generator 520 may be implemented by various techniques. For example, the language embedding generator 520 may be a neural network for generating embedding vectors based on acoustic features. The neural network may map an input acoustic feature sequence with a variable length to a fixed-length embedding vector. The neural network may adopt any sequence model, e.g., a recurrent neural network (RNN) or a transformer. The neural network only extracts language information from the input, so that inputs corresponding to the same language will result in the same or similar embedding vectors, while inputs corresponding to different languages will result in different embedding vectors. In one case, the neural network may be pre-trained by a language classification task. In another case, if no pre-training is performed, additional constraints may be applied in the training criteria for the neural network, which may minimize the distance among embedding vectors of the same language, maximize the distance among embedding vectors of different languages, etc. Specifically, in addition to the loss adopted in the training of the conventional neural TTS systems, additional losses may be introduced to ensure that the embedding vectors generated for the same language are in proximity to each other, and the embedding vectors generated for different languages are far from each other. For example, an additional loss function may be defined to minimize the distance among the embedding vectors of the same language, maximize the distance among the embedding vectors of different languages, etc.

Figure 6:
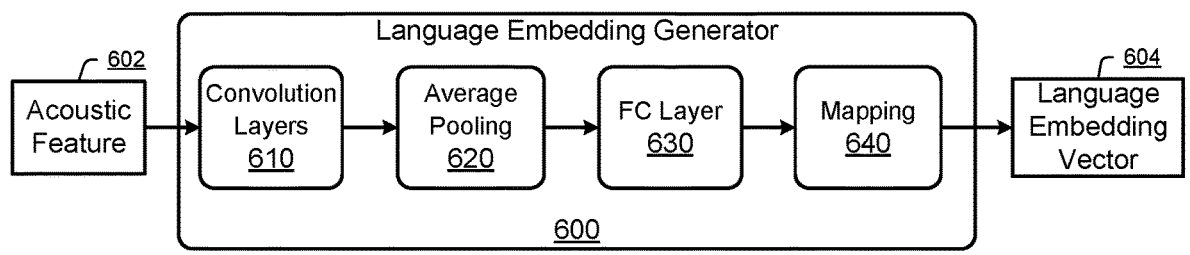
FIG. 6 illustrates an exemplary implementation of a language embedding generator according to an embodiment.

FIG. 6 illustrates an exemplary implementation of a language embedding generator 600 according to an embodiment. The language embedding generator 600 may correspond to the language embedding generator 520 in FIG. 5. As shown in FIG. 6, the language embedding generator 600 may be based on a neural network for generating a language embedding vector 604 based on an acoustic feature 602. The language embedding generator 600 may comprise multiple convolution layers 610, average pooling 620, multiple FC layers 630, and affine mapping 640 in turn. The language embedding vector 604 may be formed by performing L2 normalization to the mapping's output. The language embedding generator 600 may be trained with a corpus set of multiple languages, and is designed for language recognition that is independent of text or content. Therefore, the language embedding generator 600 may provide, independently from content, better estimation of the language embedding vector.

Figure 7:
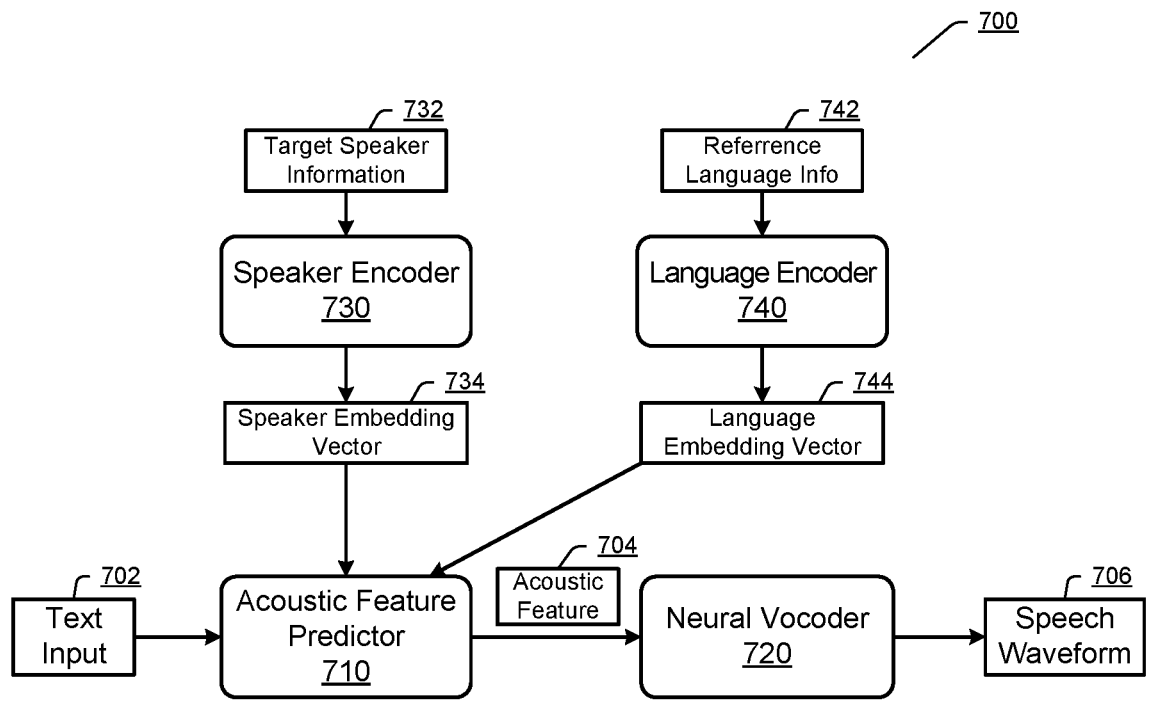
FIG. 7 illustrates an exemplary implementation of a multilingual neural TTS system according to an embodiment.

FIG. 7 illustrates an exemplary implementation 700 of a multilingual neural TTS system according to an embodiment. In the implementation 700, the multilingual neural TTS system may be used for converting a text input 702 in at least one target language into a speech waveform 706 in the target language. Specifically, an acoustic feature predictor 710 may generate at least one acoustic feature 704 based at least on the text input 702, and a neural vocoder 720 may generate a speech waveform 706 based at least on the acoustic feature 704.

In the implementation 700, the acoustic feature predictor 710 may also use a speaker embedding vector of a target speaker and a language embedding vector of a reference language as global conditions, for generating the acoustic feature 704 corresponding to the text input 702.

If it is desired to generate a speech waveform in a certain target speaker's voice, the multilingual neural TTS system may obtain information 732 of the target speaker and provide a speaker embedding vector 734 corresponding to the target speaker through the speaker encoder 730. In one case, the target speaker information 732 may be a target speaker ID of the target speaker, and thus the speaker encoder 730 may employ the speaker embedding selector 310 in FIG. 3 to retrieve the speaker embedding vector 734 corresponding to the target speaker. In another case, the target speaker information 732 may be information from a corpus of the target speaker, e.g., acoustic features extracted from the corpus. Thus, the speaker encoder 730 may employ the speaker embedding generator 320 in FIG. 3 to generate the speaker embedding vector 734 corresponding to the target speaker. The corpus data included in the corpus may be in other languages than the target language.

If it is desired to make a generated speech waveform have an accent of a reference language, the multilingual neural TTS system may obtain information 742 of the reference language and provide a language embedding vector 744 corresponding to the reference language through the language encoder 740. In one case, the reference language information 742 may be a reference language ID of the reference language, and thus the language encoder 740 may employ the language embedding selector 510 in FIG. 5 to retrieve the language embedding vector 744 corresponding to the reference language. In another case, the reference language information 742 may be information from a corpus of the reference language, e.g., acoustic features extracted from the corpus. Thus, the language encoder 740 may employ the language embedding generator 520 in FIG. 5 to generate the language embedding vector 744 corresponding to the reference language. The corpus data included in the corpus may be in other languages than the target language.

The acoustic feature predictor 710 may enable, through the speaker embedding vector 734, the at least one acoustic feature 704 to use the target speaker's voice, so that the finally generated speech sounds very similar to the target speaker's voice. The acoustic feature predictor 710 may enable, through the language embedding vector 744, the at least one acoustic feature 704 to have the accent of the reference language, so that although the finally generated speech is in the target language, the generated speech may still sound having the accent of the reference language.

Since the acoustic feature 704 contains target speaker characteristics and reference language characteristics, the speech waveform 706 generated based on the acoustic feature 704 will use the target speaker's voice on one hand, and will employ the target language and have the accent of the reference language on the other hand. It should be understood that, in this case, the neural vocoder 720 may be a general neural vocoder, which is able to directly generate the speech waveform 706 having the above-mentioned characteristics based on the acoustic feature 704.

Figure 8:
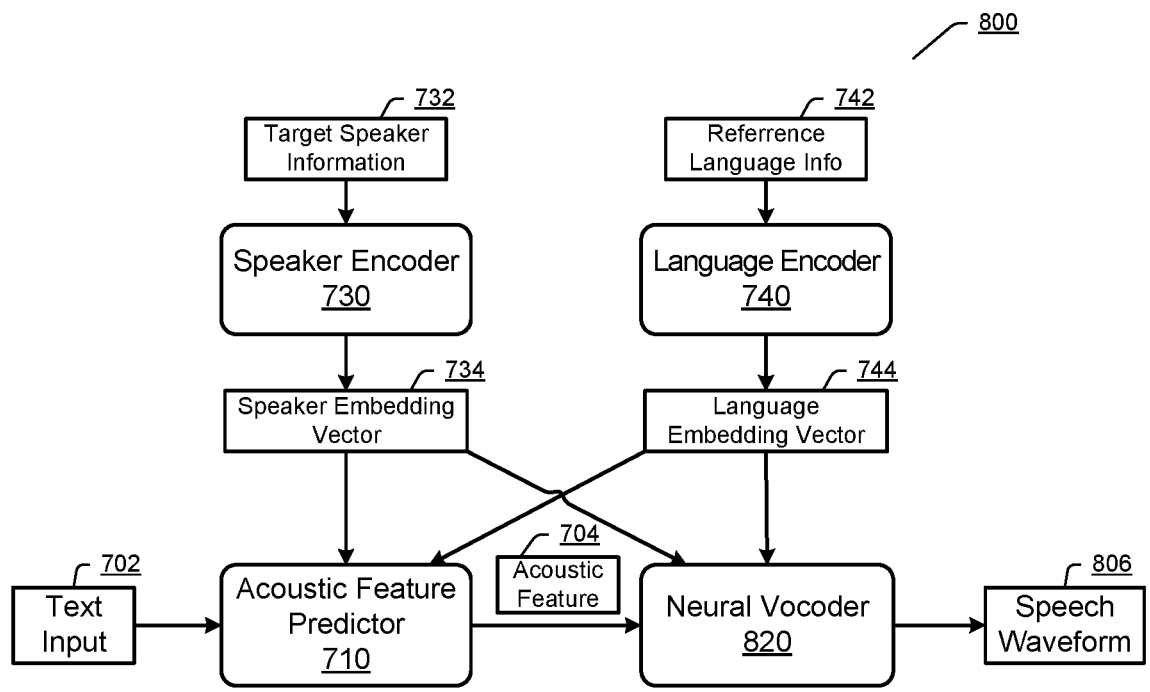
FIG. 8 illustrates an exemplary implementation of a multilingual neural TTS system according to an embodiment.

FIG. 8 illustrates an exemplary implementation 800 of a multilingual neural TTS system according to an embodiment. The implementation 800 may be construed as a variant of the implementation 700 in FIG. 7. The implementation 800 is similar with the implementation 700, except that the processing at a neural vocoder 820 is improved.

In the implementation 800, the speaker embedding vector 734 of the target speaker and the language embedding vector 744 of the reference language are used as global conditions of the acoustic feature predictor 710, and may also be optionally used as global conditions of the neural vocoder 820. That is, the neural vocoder 820 may generate a speech waveform 806 based on at least one of the acoustic feature 704, the speaker embedding vector 734 and the language embedding vector 744. Although the acoustic feature 704 may already reflect the target speaker characteristics and the reference language characteristics, the neural vocoder 820 may further improve the similarity between the generated speech waveform and the target speaker's voice by considering the speaker embedding vector 734, and may further enhance the reference language's accent in the generated speech waveform by considering the language embedding vector 744.

It should be understood that, although the exemplary implementations of the multilingual neural TTS system according to the embodiments of the present disclosure have been discussed above in conjunction with FIG. 7 and FIG. 8, these implementations may also be changed or replaced in any approaches according to specific application scenarios and design constraints.

In one case, the reference language may be the same as or different from the target language. If the reference language is different from the target language, the generated speech has an accent of the reference language while employing the target language, e.g., an English speech with a Chinese accent. If the reference language is the same as the target language, accent purity of the generated speech may be enhanced, because the language embedding vector of the reference language may reflect the more general prosody characteristics of the reference language.

In one case, the concept of "language" may be explained extensively herein. Versions of the same language in different regions or populations may be divided into different languages. For example, for "English", English used in the United Kingdom or by British may be referred to as British English, and English used in the United States or by Americans may be referred to as American English. Since there are prosody differences between British English and American English, they may be considered as two different languages.

In one case, the text input may be not limited to one language, but a mixed-language text input, which may be a combination containing content in two or more languages. For example, the text input may be "看，他是个 cowboy", wherein the English word "cowboy" is inserted in the Chinese sentence of the text input. For a mixed-language text input, the multilingual neural TTS system according to the embodiments of the present disclosure is still capable of producing speech with high naturalness. Through taking the language embedding vector of the reference language as a global condition, prosody continuity of the generated speech waveform may be guaranteed. For example, if the text input is a mixture of Chinese content and English content and the reference language is selected to be Chinese, a Chinese-and-English mixed speech with unified Chinese accent may be generated. Through taking the speaker embedding vector of the target speaker as a global condition, the similarity between the voice of the generated speech waveform and the target speaker may also be enhanced. In the case of a mixed-language text input, the reference language may be one of the languages involved in the text input, or may be a language different from all the languages involved in the text input.

In one case, the multilingual neural TTS system according to the embodiments of the present disclosure may be not limited to using one reference language, but may use two or more reference languages simultaneously. That is, two or more language embedding vectors corresponding to two or more reference languages may be used as global conditions, so that the acoustic feature generated by the acoustic feature predictor and the speech waveform finally generated by the neural vocoder have an accent between these two or more reference languages. In this case, the language encoder may provide two or more language embedding vectors corresponding to the two or more reference languages to the acoustic feature predictor and/or the neural vocoder. Taking two language embedding vectors corresponding to two reference languages as an example, the two language embedding vectors may be interpolated to obtain an interpolated language embedding vector. Interpolation weights may be used for controlling the accent to be biased towards which one of the two reference languages. Furthermore, the acoustic feature predictor may generate an acoustic feature based on the text input, the target speaker embedding vector, and the interpolated language embedding vector. Alternatively, the neural vocoder may also generate the speech waveform by considering the interpolated language embedding vector.

Figure 9:
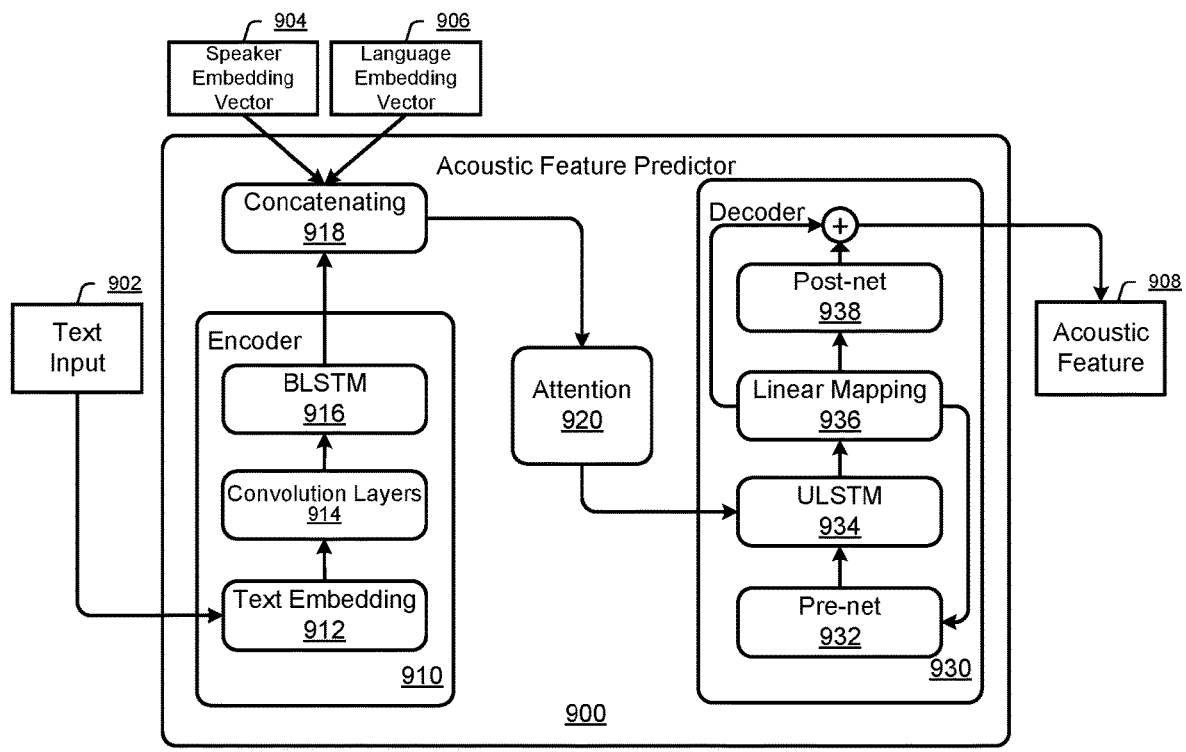
FIG. 9 illustrates an exemplary implementation of an acoustic feature predictor according to an embodiment.

FIG. 9 illustrates an exemplary implementation of an acoustic feature predictor 900 according to an embodiment. The acoustic feature predictor 900 may correspond to the acoustic feature predictor 210 in FIG. 2, the acoustic feature predictor 710 in FIG. 7 and FIG. 8, etc. The acoustic feature predictor 900 may comprise an encoder 910, an attention unit 920, and a decoder 930.

A text input 902 may be provided to the encoder 910 which may correspond to the encoder 212 in FIG. 2. A text embedding unit 912 in the encoder 910 may convert the text input 902 into a text embedding vector which may be further processed by multiple convolution layers 914 and a bidirectional LSTM (BLSTM) 916 in the encoder 910. The encoder 910 may output a text feature corresponding to the text input 902, which may be further combined with a speaker embedding vector 904 and a language embedding vector 906. For example, a concatenating unit 918 may be used for provide a combination of the text feature, the speaker embedding vector 904, and the language embedding vector 906, wherein the speaker embedding vector 904 may correspond to the speaker latent space information 232 in FIG. 2, the speaker embedding vector 734 in FIG. 7 and FIG. 8.

The combination of the text feature, the speaker embedding vector 904, and the language embedding vector 906 may be provided to an attention unit 920 which may correspond to the attention unit 214 in FIG. 2. An attention mechanism implemented in the attention unit 920 may affect the processing at the decoder 930 with the combination of the text feature, the speaker embedding vector 904, and the language embedding vector 906, wherein the decoder 930 may correspond to the decoder 216 in FIG. 2.

The decoder 930 may comprise a pre-net 932 consisted of a feedforward layer, an unidirectional LSTM (ULSTM) 934, linear mapping 936, a post-net 938 consisted of a convolution layer, etc. The ULSTM 934 may receive an input from the pre-net 932 and provide its output to the linear mapping 936, meanwhile the processing at the ULSTM 934 is affected by the attention unit 920. The linear mapping 936 may provide its output to the pre-net 932 and the post-net 938, respectively. Finally, the output of the post-net 938 is combined with the output of the linear mapping 936 to produce an acoustic feature 908. The acoustic feature 908 may correspond to the acoustic feature 204 in FIG. 2, the acoustic feature 704 in FIG. 7 and FIG. 8, etc. In an implementation, the linear mapping 936 may also be used for generating a stop token.

It should be understood that the structure of the acoustic feature predictor 900 in FIG. 9 is exemplary, and depending on specific application designs and requirements, the acoustic feature predictor 900 may be implemented in any other approaches. Moreover, the structure of the acoustic feature predictor 900 in FIG. 9 may be modified in any forms. For example, although only one language embedding vector 906 is shown in FIG. 9, two or more language embedding vectors may exist, and accordingly, the concatenating unit 918 may combine these language embedding vectors with the text feature and the speaker embedding vector 904 together.

Figure 10:
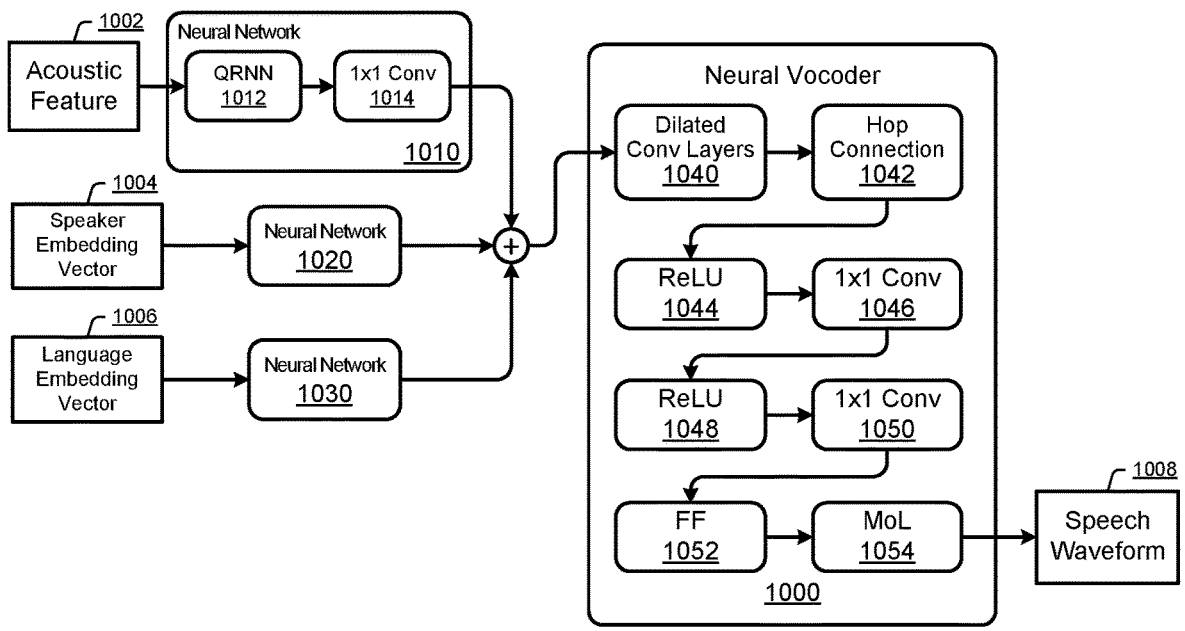
FIG. 10 illustrates an exemplary implementation of a neural vocoder according to an embodiment.

FIG. 10 illustrates an exemplary implementation of a neural vocoder 1000 according to an embodiment. The neural vocoder 1000 may correspond to the neural vocoder 220 in FIG. 2, the neural vocoder 720 in FIG. 7, the neural vocoder 820 in FIG. 8, etc.

As described above, a neural vocoder may consider speaker characteristics, so that the neural vocoder may obtain more information about a target speaker in a speaker latent space. Moreover, the neural vocoder may consider language characteristics, so that the neural vocoder may obtain more information about a reference language in a language latent space. Since the speaker embedding vector that reflects the speaker characteristics and the language embedding vector that reflects the reference language characteristics may have different dimensions and value ranges from an acoustic feature, it may first transform the speaker embedding vector, the language embedding vector, and the acoustic feature into the same dimension with similar dynamic value ranges.

An acoustic feature 1002, which may correspond to the acoustic feature 908 in FIG. 9, may be input to a neural network 1010. The neural network 1010 may be based on various structures, e.g., a quasi-regressive neural network (QRNN) 1012 together with a 1×1 convolution layer 1014. Through the neural network 1010, a transformed acoustic feature may be obtained.

A speaker embedding vector 1004 may be input to a neural network 1020. The speaker embedding vector 1004 may correspond to the speaker embedding vector 904 in FIG. 9. The neural network 1020 may be based on various structures, e.g., a 1×1 convolution layer. Through the neural network 1020, a transformed speaker embedding vector may be obtained, which has the same dimension and similar dynamic value range with the transformed acoustic feature.

A language embedding vector 1006 may be input to a neural network 1030. The language embedding vector 1006 may correspond to the language embedding vector 906 in FIG. 9. The neural network 1030 may be based on various structures, e.g., a 1×1 convolution layer. Through the neural network 1030, a transformed language embedding vector may be obtained, which has the same dimension and similar dynamic value range with the transformed acoustic feature.

The transformed acoustic feature, the transformed speaker embedding vector, and the transformed language embedding vector may be combined together and provided to the neural vocoder 1000. The neural vocoder 1000 may be based on a generative neural model, e.g., adopting an autoregressive structure, and may generate a speech waveform 1008 based on a combination of the transformed acoustic feature, the transformed speaker embedding vector, and the transformed language embedding vector.

In an implementation, the neural vocoder 1000 may comprise multiple dilated convolution layers 1040 that are grouped into a certain number of loops. The multiple dilated convolution layers 1040 may take a combination of the transformed acoustic feature, the transformed speaker embedding vector, and the transformed language embedding vector as a condition. Hop connection 1042 may be performed on the output of the multiple dilated convolution layers 1040. The neural vocoder 1000 may further comprise a rectified linear unit (ReLU) 1044, a 1×1 convolution layer 1046, a ReLU 1048, a 1×1 convolution layer 1050, multiple feedforward (FF) layers 1052, and a MoL unit 1054 in turn. Through the above structure, the neural vocoder 1000 may sequentially generate multiple speech samples and finally output a speech waveform 1008.

It should be understood that the structure of the neural vocoder 1000 in FIG. 10 is exemplary, and depending on specific application designs and requirements, the neural vocoder 1000 may be implemented in any other approaches. Moreover, the structure of the neural vocoder 1000 in FIG. 10 may be modified in any forms. For example, although it is shown in FIG. 10 that both the speaker embedding vector and the language embedding vector are provided to the neural vocoder, it is also possible that the speaker embedding vector and the language embedding vector are not provided to the neural vocoder or only either of them is provided, so that only the part associated with the actually input embedding vector may be retained in FIG. 10.

Figure 11:
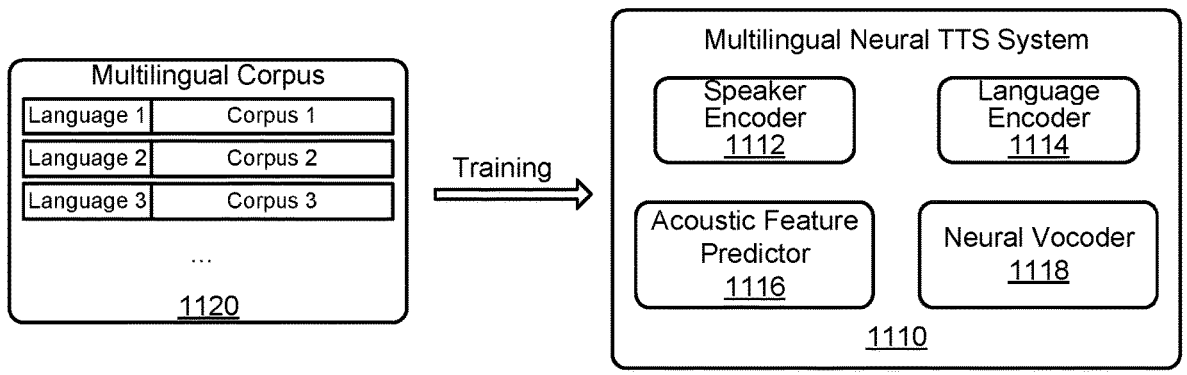
FIG. 11 illustrates an exemplary process of training a multilingual neural TTS system according to an embodiment.

FIG. 11 illustrates an exemplary process of training a multilingual neural TTS system according to an embodiment.

In order to train a multilingual neural TTS system 1110, a multilingual corpus 1120 for the training may be prepared. The multilingual corpus 1120 may comprise multiple corpus of multiple languages, e.g., corpus 1 for language 1, corpus 2 for language 2, etc. Corpus data in the multilingual corpus 1120 may come from multiple speakers.

Corpus of each language may have sufficient content coverage. For each language, content of corpus data of each speaker is not restricted, because content of corpus data of different speakers may be complementary. Moreover, the size of each speaker's own corpus data is not restricted. However, content of all corpus data for each language should be able to cover all pronunciations in that language.

Preferably, speakers in a corpus of each language are sufficiently diverse. For example, the speakers may have different genders, ages, accents, etc. This will facilitate to generate high-quality speech when synthesizing voice of a specific speaker in different languages.

Preferably, multilingual corpus data may be included in the multilingual corpus. The multilingual corpus data may refer to different speeches in different languages for the same segment of text. If sufficient multilingual corpus data is used in the training, it will facilitate to improve cross-lingual speaker similarity.

As shown in FIG. 11, the multilingual neural TTS system 1110 may comprise a speaker encoder 1112, a language encoder 1114, an acoustic feature predictor 1116, a neural vocoder 1118, etc. The structure of the multilingual neural TTS system 1110 may be similar with the multilingual neural TTS system 200 shown in FIG. 2. In an implementation, the acoustic feature predictor 1116 and the neural vocoder 1118 may be trained independently from each other. In an implementation, the speaker encoder 1112 and the language encoder 1114 may be trained jointly with the acoustic feature predictor 1116. In an implementation, the neural vocoder 1118 may also be jointly trained with the speaker encoder 1112 and the language encoder 1114. In an implementation, if the neural vocoder 1118 does not take a speaker embedding vector of a target speaker and a language embedding vector of a reference language as global conditions, the neural vocoder 1118 may be trained as a general neural vocoder that may generate speech waveforms for any speakers and any languages.

Training data for any one or any combinations of the speaker encoder 1112, the language encoder 1114, the acoustic feature predictor 1116, and the neural vocoder 1118 may be obtained based on speech waveforms in the multilingual corpus 1120. For example, various derived information may be obtained from the speech waveforms, e.g., text information obtained by applying any speech recognition technologies, acoustic features obtained by applying any acoustic feature extraction technologies, speaker embedding vectors obtained by applying any speaker recognition technologies, language embedding vectors obtained by applying any language recognition technologies, etc. The derived information along with the speech waveforms in the multilingual corpus 1120 may form various training data for any one or any combinations of the speaker encoder 1112, the language encoder 1114, the acoustic feature predictor 1116, and the neural vocoder 1118.

Figure 12:
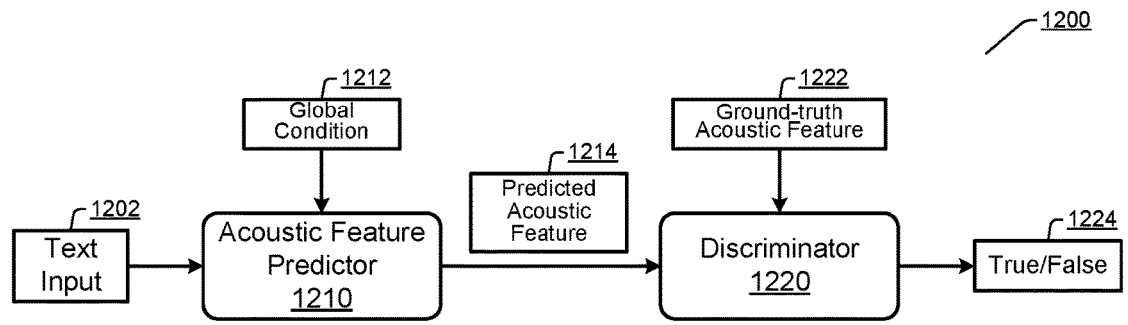
FIG. 12 illustrates an exemplary process of training an acoustic feature predictor through a generative adversarial network according to an embodiment.

FIG. 12 illustrates an exemplary process 1200 of training an acoustic feature predictor through a generative adversarial network according to an embodiment.

The generative adversarial network may comprise an acoustic feature predictor 1210 as a generator. Moreover, the generative adversarial network further comprises a discriminator 1220. The acoustic feature predictor 1210 may learn to predict or generate an acoustic feature 1214 based on a text input 1202 and global conditions 1212, so that the predicted acoustic feature may best approximate an acoustic feature in the training data, i.e., a ground-truth acoustic feature. The global conditions 1212 may comprise a speaker embedding vector of a target speaker and/or a language embedding vector of a reference language. The discriminator 1220 may learn to distinguish between the predicted acoustic feature 1214 output by the acoustic feature predictor 1210 and the ground-truth acoustic feature 1222 in the training data, and output a discrimination result 1220, e.g., true or false. This discrimination result may be further used for updating or improving the acoustic feature predictor 1210 and the discriminator 1220.

In one case, when it is intended to improve speaker similarity of the synthesized speech in different languages, the discriminator 1220 may learn to distinguish among different speakers, e.g., distinguish between acoustic characteristics of one speaker and acoustic characteristics of other speakers. In one case, when it is intended to improve accent of the synthesized speech so as to be closer to the accent of native speakers of the reference language in cross-lingual synthesis, the discriminator 1220 may learn to distinguish among different languages, e.g., distinguish between acoustic characteristics of one language and acoustic characteristics of other languages.

It should be understood that although FIG. 12 shows training the acoustic feature predictor in an adversarial training approach, a neural vocoder and the like may also be iteratively trained in the adversarial training approach similarly.

Figure 13:
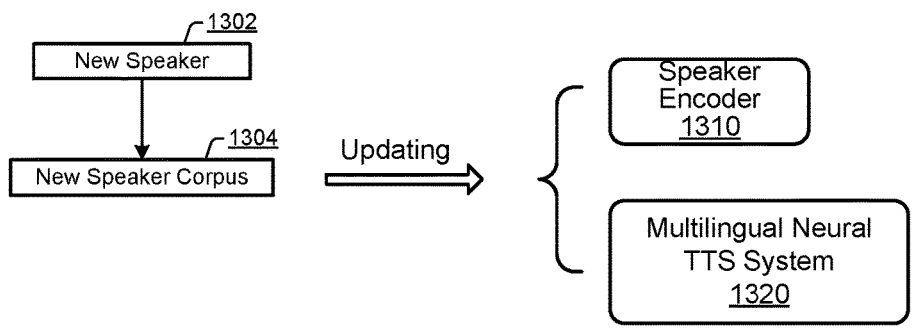
FIG. 13 illustrates an exemplary process of updating a multilingual neural TTS system for a new speaker according to an embodiment.

FIG. 13 illustrates an exemplary process of updating a multilingual neural TTS system for a new speaker according to an embodiment. The multilingual neural TTS system according to the embodiments of the present disclosure may be efficiently tuned to a new speaker, i.e., registering a new speaker or registering a new voice.

In one case, a corpus 1304 of a new speaker 1302 may only have very limited corpus data, e.g., only having a small amount of speeches of the new speaker. In this case, the multilingual neural TTS system may be directly applied for generating multilingual speech for the new speaker without the need of updating components in the multilingual neural TTS system. For example, a speaker encoder may generate a speaker embedding vector corresponding to the new speaker with one or more pieces of corpus data of the new speaker, and the speaker embedding vector may be further used as a global condition of an acoustic feature predictor and/or a neural vocoder.

In another case, if the corpus 1304 of the new speaker 1302 has a relatively large amount of corpus data, e.g., having more than 50 speeches, then the corpus of the new speaker may be used for updating at least a part of the components of the multilingual neural TTS system, e.g., at least one of the speaker encoder, a language encoder, the acoustic feature predictor, and the neural vocoder. The updated system may be further applied for generating multilingual speech for the new speaker. As shown in FIG. 13, in one approach, only the speaker encoder 1310 in the multilingual neural TTS system may be updated, and in another approach, two or more components in the multilingual neural TTS system 1320 may be updated, e.g., two or more components among the speaker encoder, the language encoder, the acoustic feature predictor, and the neural vocoder. It should be understood that if the neural vocoder is a general neural vocoder, the neural vocoder may be not updated.

The corpus 1304 of the new speaker 1302 may be used for forming various training data for the above updating process. These training data may be obtained from the corpus 1304 in a similar manner as discussed above in connection with FIG. 11.

Through the updating process of FIG. 13, the multilingual neural TTS system may be better tuned to a new speaker and may generate high-quality speech for the new speaker.

It should be understood that, according to an embodiments of the present disclosure, a new voice may also be generated through interpolation. For example, speaker embedding vectors from different speakers may be obtained, and then are interpolated to obtain an interpolated speaker embedding vector. The interpolated speaker embedding vector may correspond to a new voice, wherein interpolation weights may be used for controlling the similarity between the new voice and voices of different speakers.

According to an embodiment of the present disclosure, the multilingual neural TTS system may also be efficiently tuned to a new language. A corpus of the new language may be obtained and used for updating at least a part of components of the multilingual neural TTS system, e.g., at least one of the language encoder, the speaker encoder, the acoustic feature predictor, and the neural vocoder. The corpus of the new language may be used for forming various training data for the above updating process. The training data may be obtained from the corpus of the new language in a similar manner as discussed above in connection with FIG. 11. The updated multilingual neural TTS system may make better use of knowledge from other languages to generate high-quality speech in this new language.

Figure 14:
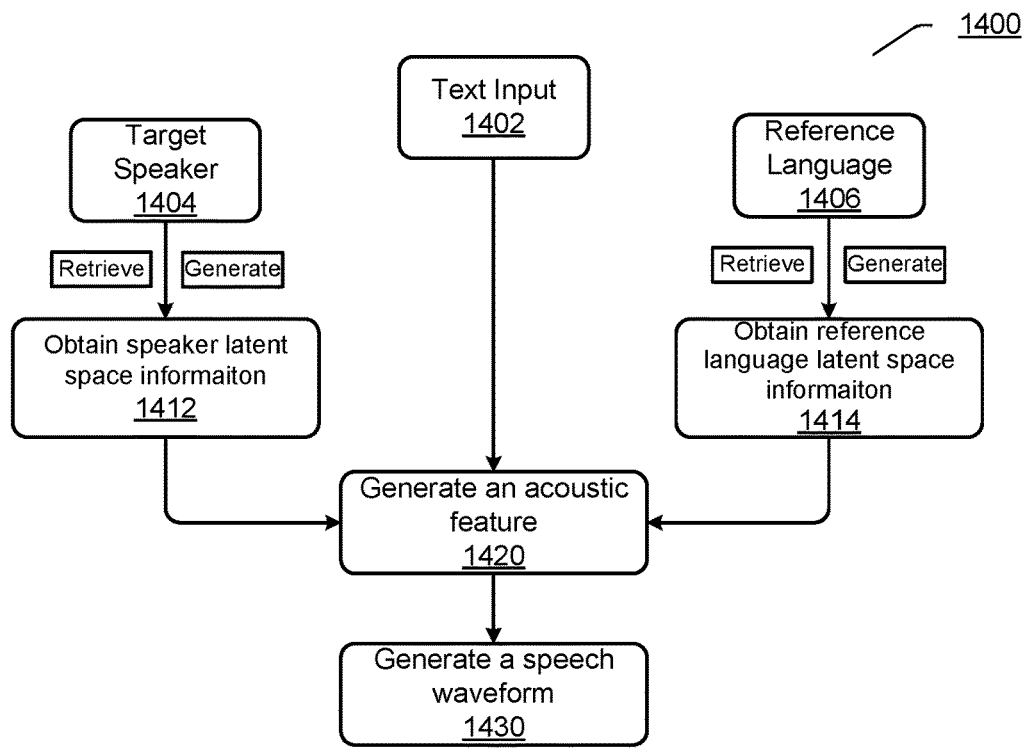
FIG. 14 illustrates an exemplary processing flow for generating a speech waveform according to an embodiment.

FIG. 14 illustrates an exemplary processing flow 1400 for generating a speech waveform according to an embodiment.

A text input 1402 may be received. At least one target language may be applied to the text input 1402, which is the language adopted by a speech to be generated.

An indication of a target speaker 1404 may be obtained. For example, a user may indicate in various ways that he wants to use the voice of the target speaker 1404 in the speech to be generated.

An indication of a reference language 1406 may be obtained. For example, the user may indicate in various ways that he wants to use the accent of the reference language 1406 in the speech to be generated. The reference language 1406 may comprise one or more reference languages, and may be the same as or different from the target language.

At 1412, speaker latent space information corresponding to the target speaker may be obtained. The speaker latent space information corresponding to the target speaker may be obtained in any of the approaches discussed above. For example, a target speaker ID of the target speaker may be obtained first, and then corresponding speaker latent space information may be retrieved from a speaker latent space information database based on the target speaker ID. Moreover, for example, the speaker latent space information corresponding to the target speaker may be generated based on a corpus of the target speaker.

At 1414, language latent space information corresponding to the reference language may be obtained. The language latent space information corresponding to the reference language may be obtained in any of the approaches discussed above. For example, a reference language ID of the reference language may be obtained first, and then corresponding language latent space information may be retrieved from a language latent space information database based on the reference language ID. Moreover, for example, the language latent space information corresponding to the reference language may be generated based on a corpus of the reference language.

At 1420, an acoustic feature corresponding to the text input 1402 may be generated through taking the speaker latent space information corresponding to the target speaker and the language latent space information corresponding to the reference language as global conditions.

At 1430, a speech waveform may be further generated based at least on the generated acoustic feature. Alternatively, the speech waveform may also be generated through taking at least one of the speaker latent space information corresponding to the target speaker and the language latent space information corresponding to the reference language as global conditions. The generated speech waveform may adopt various audio formats, and may be played to the user in the form of speech.

It should be understood that the processing flow 1400 may further comprise any steps/processes for generating speech through multilingual neural TTS synthesis according to the embodiments of the present disclosure as discussed above.

Figure 15:
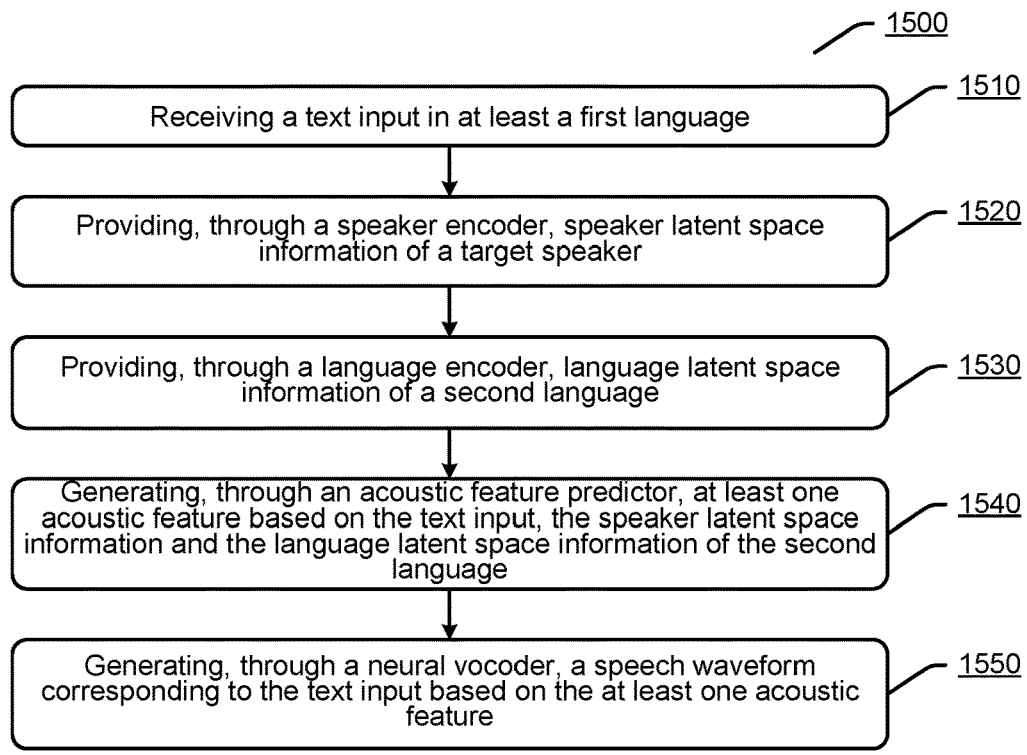
FIG. 15 illustrates a flowchart of an exemplary method for generating speech through multilingual neural TTS synthesis according to an embodiment.

FIG. 15 illustrates a flowchart of an exemplary method 1500 for generating speech through multilingual neural TTS synthesis according to an embodiment.

At 1510, a text input in at least a first language may be received.

At 1520, speaker latent space information of a target speaker may be provided through a speaker encoder.

At 1530, language latent space information of a second language may be provided through a language encoder.

At 1540, at least one acoustic feature may be generated, through an acoustic feature predictor, based on the text input, the speaker latent space information and the language latent space information of the second language.

At 1550, a speech waveform corresponding to the text input may be generated, through a neural vocoder, based on the at least one acoustic feature.

In an implementation, generating at least one acoustic feature may comprise: generating the at least one acoustic feature corresponding to the text input through utilizing the speaker latent space information and the language latent space information of the second language as global conditions of the acoustic feature predictor. The acoustic feature predictor enables, through the speaker latent space information, the at least one acoustic feature to use a voice of the target speaker, and enables, through the language latent space information of the second language, the at least one acoustic feature to have an accent of the second language.

In an implementation, the generated speech waveform may use a voice of the target speaker, employ the first language and have an accent of the second language.

In an implementation, the speech waveform may be generated, through the neural vocoder, further based on at least one of the speaker latent space information and the language latent space information of the second language.

In an implementation, the language latent space information of the second language may comprise representation of prosody of the second language in a multi-dimension space.

In an implementation, the second language may be the same as or different from the first language.

In an implementation, the method 1500 may further comprise: providing, through the language encoder, language latent space information of the third language; and interpolating the language latent space information of the second language and the language latent space information of the third language, to obtain interpolated language latent space information. Generating at least one acoustic feature may comprise: generating the at least one acoustic feature based on the text input, the speaker latent space information and the interpolated language latent space information. The at least one acoustic feature and the speech waveform may have an accent between the second language and the third language.

In an implementation, the text input may comprise content in the first language and content in a third language. The second language may be the same as the first language or the third language.

In an implementation, providing speaker latent space information of a target speaker may comprise at least one of: generating the speaker latent space information based on a corpus of the target speaker in a language different from the first language; and retrieving the speaker latent space information corresponding to the target speaker from a speaker latent space information database.

In an implementation, the method 1500 may further comprise: updating at least one of the speaker encoder, the language encoder and the acoustic feature predictor based on a corpus of the target speaker.

In an implementation, the method 1500 may further comprise: training the acoustic feature predictor through a generative adversarial network. The generative adversarial network may comprise: a generator which is based on the acoustic feature predictor; and a discriminator for discriminating speaker or language.

In an implementation, the method 1500 may further comprise: training at least one of the speaker encoder, the language encoder, the acoustic feature predictor and the neural vocoder based on a multilingual corpus, wherein the multilingual corpus comprises corpus data from multiple languages and multiple speakers.

It should be understood that the method 1500 may further comprise any step/process for generating speech through multilingual neural TTS synthesis according to the embodiments of the present disclosure as mentioned above.

Figure 16:
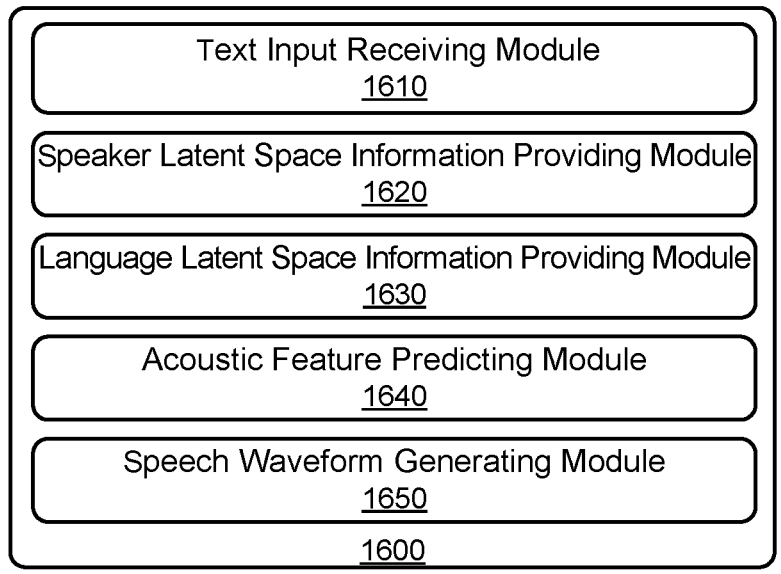
FIG. 16 illustrates an exemplary apparatus for generating speech through multilingual neural TTS synthesis according to an embodiment.

FIG. 16 illustrates an exemplary apparatus 1600 for generating speech through multilingual neural TTS synthesis according to an embodiment.

The apparatus 1600 may comprise: a text input receiving module 1610, for receiving a text input in at least a first language; a speaker latent space information providing module 1620, for providing speaker latent space information of a target speaker; a language latent space information providing module 1630, for providing language latent space information of a second language; an acoustic feature predicting module 1640, for generating at least one acoustic feature based on the text input, the speaker latent space information and the language latent space information of the second language; and a speech waveform generating module 1650, for generating a speech waveform corresponding to the text input based on the at least one acoustic feature.

Moreover, the apparatus 1600 may further comprise any other modules configured for generating speech through multilingual neural TTS synthesis according to the embodiments of the present disclosure as mentioned above.

Figure 17:
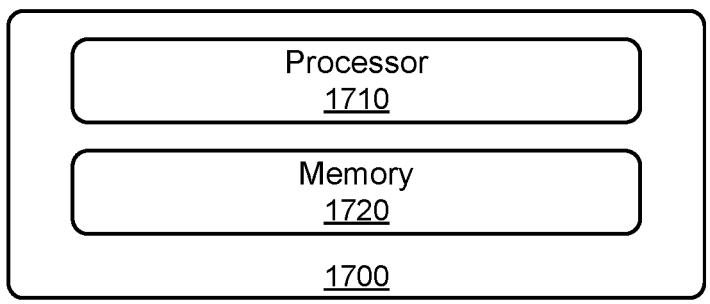
FIG. 17 illustrates an exemplary apparatus for generating speech through multilingual neural TTS synthesis according to an embodiment.

FIG. 17 illustrates an exemplary apparatus 1700 for generating speech through multilingual neural TTS synthesis according to an embodiment.

The apparatus 1700 may include at least one processor 1710 and a memory 1720 storing computer-executable instructions. When the computer-executable instructions are executed, the processor 1710 may: receive a text input in at least a first language; provide, through a speaker encoder, speaker latent space information of a target speaker; provide, through a language encoder, language latent space information of a second language; generate, through an acoustic feature predictor, at least one acoustic feature based on the text input, the speaker latent space information and the language latent space information of the second language; and generate, through a neural vocoder, a speech waveform corresponding to the text input based on the at least one acoustic feature. Moreover, the processor 1710 may further perform any step/process for generating speech through multilingual neural TTS synthesis according to the embodiments of the present disclosure as mentioned above.

The embodiments of the present disclosure may be embodied in a non-transitory computer-readable medium. The non-transitory computer-readable medium may comprise instructions that, when executed, cause one or more processors to perform any operations of the methods for generating speech through multilingual neural TTS synthesis according to the embodiments of the present disclosure as mentioned above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors are described in connection with various apparatus and methods. These processors may be implemented using electronic hardware, computer software, or any combination thereof. Whether these processors are implemented as hardware or software will depend on the specific application and the overall design constraints imposed on the system. By way of example, a processor, any portion of a processor, or any combination of processors presented in this disclosure may be implemented as a microprocessor, a micro-controller, a digital signal processor (DSP), a field programmable gate array (FPGA), a programmable logic device (PLD), state machine, gate logic, discrete hardware circuitry, and other suitable processing components configured to perform the various functions described in this disclosure. The functions of a processor, any portion of a processor, or any combination of processors presented in this disclosure may be implemented as software executed by a microprocessor, a micro-controller, a DSP, or other suitable platforms.

Software should be considered broadly to represent instructions, instruction sets, code, code segments, program code, programs, subroutines, software modules, applications, software applications, software packages, routines, subroutines, objects, running threads, processes, functions, etc. Software may reside on computer readable medium. Computer readable medium may include, e.g., a memory, which may be, e.g., a magnetic storage device (e.g., a hard disk, a floppy disk, a magnetic strip), an optical disk, a smart card, a flash memory device, a random access memory (RAM), a read only memory (ROM), a programmable ROM (PROM), an erasable PROM (EPROM), an electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for generating speech through multilingual neural text-to-speech (TTS) synthesis, comprising:
   receiving a text input in at least a first language and a target speaker ID;
   providing, through a speaker encoder, speaker latent space information of a target speaker in the form of a speaker embedding vector associated with the target speaker ID;
   providing, through a language encoder, language latent space information of a second language in the form of a language embedding vector associated with a target language ID;
   generating, through an acoustic feature predictor, at least one acoustic feature based on the text input, the speaker latent space information and the language latent space information of the second language; and
   generating, through a neural vocoder, a speech waveform corresponding to the text input based on the at least one acoustic feature and the speaker latent space information.

2. The method of claim 1, wherein generating at least one acoustic feature comprises:
   generating the at least one acoustic feature corresponding to the text input through utilizing the speaker latent space information and the language latent space information of the second language as global conditions of the acoustic feature predictor, via a neural network encoder decoder of the acoustic feature predictor.

3. The method of claim 2, wherein the acoustic feature predictor enables, through the speaker latent space information, the at least one acoustic feature to use a voice of the target speaker, and enables, through the language latent space information of the second language, the at least one acoustic feature to have an accent of the second language.

4. The method of claim 1, wherein the generated speech waveform uses a voice of the target speaker, employs the first language and has an accent of the second language.

5. The method of claim 1, wherein the speech waveform is generated, through the neural vocoder, further based on the language latent space information of the second language.

6. The method of claim 1, wherein the language latent space information of the second language comprises representation of prosody of the second language in a multi-dimension space.

7. The method of claim 1, further comprising:
   providing, through the language encoder, language latent space information of the third language; and
   interpolating the language latent space information of the second language and the language latent space information of the third language, to obtain interpolated language latent space information,
   wherein generating at least one acoustic feature comprises: generating the at least one acoustic feature based on the text input, the speaker latent space information and the interpolated language latent space information.

8. The method of claim 7, wherein the at least one acoustic feature and the speech waveform have an accent between the second language and the third language.

9. The method of claim 1, wherein the text input comprises content in the first language and content in a third language.

10. The method of claim 1, further comprising:
    updating at least one of the speaker encoder, the language encoder and the acoustic feature predictor based on a corpus of the target speaker.

11. The method of claim 1, further comprising:
    training the acoustic feature predictor through a generative adversarial network.

12. A multilingual neural text-to-speech (TTS) system, comprising:
    a speaker encoder, for providing speaker latent space information in the form of a speaker embedding vector associated with a target speaker ID of a target speaker;
    a language encoder, for providing language latent space information of a second language in the form of a language embedding vector associated with a target language ID;
    an acoustic feature predictor, for generating at least one acoustic feature based on a text input in at least a first language, the speaker latent space information and the language latent space information of the second language; and
    a neural vocoder, for generating a speech waveform corresponding to the text input based on the at least one acoustic feature and the speaker latent space information.

13. The multilingual neural TTS system of claim 12, wherein the generated speech waveform uses a voice of the target speaker, employs the first language and has an accent of the second language.

14. An apparatus for generating speech through multilingual neural text-to-speech (TTS) synthesis, comprising:
    a text input receiving module, for receiving a text input in at least a first language and a target speaker ID;
    a speaker latent space information providing module, for providing speaker latent space information of a target speaker in the form of a speaker embedding vector associated with the target speaker ID;
    a language latent space information providing module, for providing language latent space information of a second language in the form of a language embedding vector associated with a target language ID;
an acoustic feature predicting module, for generating at least one acoustic feature based on the text input, the speaker latent space information and the language latent space information of the second language; and
a speech waveform generating module, for generating a speech waveform corresponding to the text input based on the at least one acoustic feature and the speaker latent space information.

15. An apparatus for generating speech through multilingual neural text-to-speech (TTS) synthesis, comprising:
at least one processor; and
a memory storing computer-executable instructions that, when executed, cause the at least one processor to:
receive a text input in at least a first language and a target speaker ID;
provide, through a speaker encoder, speaker latent space information of a target speaker in the form of a speaker embedding vector associated with the target speaker ID;
provide, through a language encoder, language latent space information of a second language in the form of a language embedding vector associated with a target language ID;
generate, through an acoustic feature predictor, at least one acoustic feature based on the text input, the speaker latent space information and the language latent space information of the second language; and
generate, through a neural vocoder, a speech waveform corresponding to the text input based on the at least one acoustic feature and the speaker latent space information.

16. The method of claim 1 wherein the language latent space information comprises a representation of prosody of a language in a multi-dimension space which reflects one or more characteristics of the language in a prosody level comprising at least one of a tone, a rhythm, and a speech speed.

17. The method of claim 1 wherein the speaker latent space information comprises a representation of the target speaker in a second language different form the first language and is a representation of voice characteristic of the speaker in a multi-dimension space.

18. The method of claim 1 wherein the neural vocoder is trained to generate speech waveforms for the target speaker in the second language.

* * * * *